(12) United States Patent
Wang et al.

(10) Patent No.: US 10,769,913 B2
(45) Date of Patent: Sep. 8, 2020

(54) CLOUD-BASED VIDEO SURVEILLANCE MANAGEMENT SYSTEM

(75) Inventors: Lei Wang, Clovis, CA (US); Hongwei Zhu, Fresno, CA (US); Farzin Aghdasi, Clovis, CA (US); Greg Millar, Coarsegold, CA (US)

(73) Assignee: PELCO, INC., Fresno, CA (US)

( * ) Notice: Subject to any disclaimer, the term of this patent is extended or adjusted under 35 U.S.C. 154(b) by 817 days.

(21) Appl. No.: 13/335,591

(22) Filed: Dec. 22, 2011

(65) Prior Publication Data

US 2013/0166711 A1 Jun. 27, 2013

(51) Int. Cl.
*G08B 13/196* (2006.01)
*H04N 7/18* (2006.01)
(Continued)

(52) U.S. Cl.
CPC . *G08B 13/19671* (2013.01); *G08B 13/19643* (2013.01); *G08B 13/19645* (2013.01);
(Continued)

(58) Field of Classification Search
CPC ............. H04N 7/181; H04N 21/44008; H04N 21/8133; H04N 21/4828; G08B 13/19671;
(Continued)

(56) References Cited

U.S. PATENT DOCUMENTS 3,641,257 A * 2/1972 Taylor .............. G08B 13/19602
348/154

4,692,806 A * 9/1987 Anderson ............... G06T 3/403
375/240.08
(Continued)

FOREIGN PATENT DOCUMENTS

CN 101052123 A 10/2007
CN 101097649 A 1/2008
(Continued)

OTHER PUBLICATIONS

International Search Report and Written Opinion for PCT/US2012/062114, dated Mar. 26, 2013.
(Continued)

*Primary Examiner* — Aaron N Strange
(74) *Attorney, Agent, or Firm* — Tutunjian & Bitetto, P.C.

(57) ABSTRACT

Systems and methods are described herein that provide a three-tier intelligent video surveillance management system. An example of a system described herein includes a gateway configured to obtain video content and metadata relating to the video content from a plurality of network devices, a metadata processing module communicatively coupled to the gateway and configured to filter the metadata according to one or more criteria to obtain a filtered set of metadata, a video processing module communicatively coupled to the gateway and the metadata processing module and configured to isolate video portions, of video the content, associated with respective first portions of the filtered set of metadata, and a cloud services interface communicatively coupled to the gateway, the metadata processing module and the video processing module and configured to provide at least some of the filtered set of metadata or the isolated video portions to a cloud computing service.

20 Claims, 8 Drawing Sheets

(51) Int. Cl.
  *H04N 21/44* (2011.01)
  *H04N 21/81* (2011.01)
  *H04N 21/482* (2011.01)
(52) U.S. Cl.
  CPC ....... *G08B 13/19656* (2013.01); *H04N 7/181* (2013.01); *H04N 21/44008* (2013.01); *H04N 21/4828* (2013.01); *H04N 21/8133* (2013.01)
(58) Field of Classification Search
  CPC ........ G08B 13/19645; G08B 13/19643; G08B 13/19656
  See application file for complete search history.

(56) References Cited

U.S. PATENT DOCUMENTS

| | | | |
|---|---|---|---|
| 6,069,655 A * | 5/2000 | Seeley | H04N 7/181 348/154 |
| 6,301,440 B1 | 10/2001 | Bolle et al. | |
| 6,698,021 B1 * | 2/2004 | Amini et al. | 725/105 |
| 7,205,520 B1 * | 4/2007 | Busse | F41H 11/02 250/203.6 |
| 7,391,907 B1 * | 6/2008 | Venetianer | G06K 9/00771 382/103 |
| 2004/0075738 A1 * | 4/2004 | Burke | G08B 13/19656 348/143 |
| 2005/0036659 A1 * | 2/2005 | Talmon et al. | 382/103 |
| 2005/0078853 A1 * | 4/2005 | Buehler | G06T 7/2053 382/103 |
| 2006/0190419 A1 | 8/2006 | Bunn et al. | |
| 2007/0250862 A1 | 10/2007 | Miyamaki et al. | |
| 2007/0300250 A1 | 12/2007 | Smith et al. | |
| 2008/0005088 A1 | 1/2008 | Yanai | |
| 2008/0024609 A1 | 1/2008 | Konishi | |
| 2008/0024610 A1 | 1/2008 | Konishi | |
| 2008/0046925 A1 | 2/2008 | Lee et al. | |
| 2008/0184245 A1 | 7/2008 | St-Jean | |
| 2008/0244409 A1 | 10/2008 | Millar et al. | |
| 2009/0135007 A1 | 5/2009 | Donovan et al. | |
| 2009/0219392 A1 | 9/2009 | Roskowski | |
| 2009/0316955 A1 | 12/2009 | Takeuchi | |
| 2010/0246669 A1 * | 9/2010 | Harel | G06F 11/1004 375/240.02 |
| 2010/0321183 A1 * | 12/2010 | Donovan et al. | 340/540 |
| 2011/0050947 A1 | 3/2011 | Marman et al. | |
| 2011/0109742 A1 | 5/2011 | Laganiere et al. | |
| 2011/0211036 A1 | 9/2011 | Tran | |
| 2011/0252071 A1 | 10/2011 | Cidon | |
| 2012/0057050 A1 * | 3/2012 | Ashdown | 348/234 |
| 2012/0133774 A1 * | 5/2012 | Sarhan | 348/159 |
| 2012/0300081 A1 * | 11/2012 | Kim | G08B 13/19656 348/159 |
| 2013/0162838 A1 * | 6/2013 | Huang | H04N 7/181 348/169 |
| 2014/0185877 A1 | 7/2014 | Suzuki et al. | |
| 2014/0225719 A1 * | 8/2014 | Kesavan | B60R 16/02 340/425.5 |
| 2014/0333776 A1 * | 11/2014 | Dedeoglu et al. | 348/159 |
| 2014/0333777 A1 | 11/2014 | Tink et al. | |
| 2015/0022666 A1 * | 1/2015 | Kay et al. | 348/159 |

FOREIGN PATENT DOCUMENTS

| | | |
|---|---|---|
| CN | 101098468 A | 1/2008 |
| CN | 101118680 A | 2/2008 |
| CN | 101127892 A | 2/2008 |
| CN | 101615295 A | 12/2009 |
| CN | 101778260 A | 7/2010 |
| CN | 201957067 U | 8/2011 |
| CN | 102244774 A | 11/2011 |
| JP | 2005348157 A | 12/2005 |
| JP | 2008015566 A | 1/2008 |
| JP | 2008016895 A | 1/2008 |
| JP | 2008016898 A | 1/2008 |
| WO | 2011041903 A1 | 4/2011 |
| WO | 2010125483 A2 | 11/2013 |

OTHER PUBLICATIONS

International Preliminary Report on Patentability for International Application No. PCT/US2012/062114, dated Jul. 3, 2014, 6 pages.
IP Australia 1st Examination Report for Application No. 2012355879, dated Mar. 10, 2015, 3 pgs.
State Intellectual Property Office of the P.R.C. (SIPO) 1st Office Action (translation) for Application No. 201280063674 dated Jul. 2, 2015, 11 pgs.
IP Australia 3rd Examination Report for Application No. 2012355879 dated Jan. 12, 2016, 3 pgs.
State Intellectual Property Office of the P.R.C. (SIPO) 2nd Office Action (original) and Supplementary Search Report (translation) for Application No. 201280063674 dated Feb. 15, 2016, 19 pgs.
IP Australia 4th Examination Report for Application No. 2012355879 dated Mar. 3, 2016, 2 pgs.
Japan Patent Offfice (JPO) Notification of Reasons for Refusal and Search Report for Application No. 2014-549045 dated Jul. 5, 2016 (Official Translation), 21 pgs.
State Intellectual Property Office of the P.R.C. (SIPO) Notification to Grant Patent Right for Invention for Application No. 201280063674 dated Aug. 9, 2016 (Official Translation), 2 pgs.
Communication about intention to grant a European patent dated May 5, 2016 for European Application No. EP12860946.8, 1 pg.
State Intellectual Property Office of the P.R.C. (SIPO) 2nd Office Action for Application No. 201280063674 dated Feb. 15, 2016 (Official Translation), 21 pgs.
State Intellectual Property Office of the P.R.C. (SIPO) 1st Office Action and Search Report for Application No. 201280063674 dated Jul. 2, 2015, 17 pgs. (Chinese language, no translation available).
IP Australia 2nd Examination Report for Application No. 2012355879 dated Aug. 7, 2015, 3 pgs.
Extended European Search Report (European Search Report & European Search Opinion) dated Sep. 8, 2015 for European Application No. EP12860946.8, 8 pgs.

* cited by examiner

CLOUD-BASED VIDEO SURVEILLANCE MANAGEMENT SYSTEM

BACKGROUND

Security cameras are commonly used to monitor indoor and outdoor locations. Networks of security cameras may be used to monitor a given area. For example, hundreds of cameras may be used to provide video feeds of sections of a college campus. Cameras within a security camera network are typically not aware of their location within the system or the existence and locations of other cameras in the system. Thus, a user monitoring video feeds produced by the security cameras manually analyzes and processes the video feeds to track and locate objects within the monitored area. Additionally, conventional security camera networks operate as a closed system, in which networked security cameras provide video feeds for a single geographic area and a user observes the video feeds and operates the network from a fixed-location user terminal located at the same geographic area.

SUMMARY

An example of a method of managing a video surveillance system according to the disclosure includes obtaining video content and metadata relating to the video content from multiple network devices; filtering the metadata according to one or more criteria to obtain a filtered set of metadata; isolating video portions, of the video content, associated with respective first portions of the filtered set of metadata; and providing at least some of the filtered set of metadata or the isolated video portions to a cloud computing service.

Implementations of the method can include one or more of the following features. The network devices comprise at least one of cameras or video encoders. Respective ones of the network devices are associated with respective local networks, and each of the local networks is associated with distinct geographic locations. Evaluating quality of the metadata according to the one or more criteria, classifying second portions of the metadata having a quality below a threshold as noise metadata, and excluding the noise metadata from the filtered set of metadata. Obtaining the metadata from at least a first network device and a second network device, where the first network device and the second network device maintain metadata for overlapping geographic areas. Identifying a metadata element obtained from the first network device that corresponds to an area for which the first network device and the second network device maintain metadata, determining whether a corresponding metadata element has been obtained from the second network device, and classifying the metadata element as noise if the corresponding metadata element has not been obtained from the second network device. Evaluating the quality of the metadata based on at least one of spatial relationships within video content corresponding to the metadata or temporal relationships within the video content corresponding to the metadata. Identifying a metadata element associated with an object detected by a network device and classifying the metadata element as noise if the object disappears within a threshold amount of time from its appearance or if the object exhibits at least a threshold degree of change with respect to moving direction, size or moving speed. The metadata correspond to at least one of objects tracked within the video surveillance system or events within the video surveillance system. Processing the video content to generate one or more supplementary metadata elements. Receiving a query of at least one of the metadata or the video content and processing the query according to one or more predefined rules.

An example of a video surveillance management system according to the disclosure includes a gateway configured to obtain video content and metadata relating to the video content from multiple network devices; a metadata processing module communicatively coupled to the gateway and configured to filter the metadata according to one or more criteria to obtain a filtered set of metadata; a video processing module communicatively coupled to the gateway and the metadata processing module and configured to isolate video portions, of video the content, associated with respective first portions of the filtered set of metadata; and a cloud services interface communicatively coupled to the gateway, the metadata processing module and the video processing module and configured to provide at least some of the filtered set of metadata or the isolated video portions to a cloud computing service.

Implementations of the system can include one or more of the following features. The network devices comprise at least one of cameras or video encoders. The metadata processing module is further configured to evaluate quality of the metadata according to the one or more criteria, to classify respective second portions of the metadata having a quality below a threshold as noise metadata, and to exclude the noise metadata from the filtered set of metadata. The gateway is further configured to obtain the metadata from at least a first network device and a second network device, wherein the first network device and the second network device maintain metadata for overlapping geographic areas, and the metadata processing module is further configured to identify a metadata element obtained from the first network device that corresponds to an area for which the first network device and the second network device maintain metadata, to determine whether a corresponding metadata element has been obtained from the second network device, and to classify the metadata element as noise if the corresponding metadata element has not been obtained from the second network device. The metadata processing module is further configured to evaluate the quality of the metadata based on at least one of spatial relationships within video content corresponding to the metadata or temporal relationships within the video content corresponding to the metadata. The metadata processing module is further configured to identify a metadata element associated with an object detected by a network device and to classify the metadata element as noise if the object disappears within a threshold amount of time from its appearance or if the object exhibits at least a threshold degree of change with respect to moving direction, size or moving speed. The metadata correspond to at least one of objects tracked within the video surveillance system or events within the video surveillance system. The video processing module is further configured to generate one or more supplementary metadata elements based on the video content. A rule engine communicatively coupled to the gateway, the metadata processing module and the video processing module and configured to receive a query of at least one of the metadata or the video content and to process the query according to one or more predefined rules.

Another example of a video surveillance management system according to the disclosure includes network interface means for obtaining video content and metadata relating to the video content from multiple network devices; metadata processing means, communicatively coupled to the network interface means, for filtering the metadata according to one or more criteria to obtain a filtered set of metadata;

and video processing means, communicatively coupled to the network interface means and the metadata processing means, for isolating video portions, of the video content, associated with respective first portions of the filtered set of metadata; where the network interface means comprises means for providing at least some of the filtered set of metadata or the isolated video portions to a cloud computing service.

Implementations of the system can include one or more of the following features. The network devices comprise at least one of cameras or video encoders. Means for evaluating quality of the metadata according to the one or more criteria, classifying second portions of the metadata having a quality below a threshold as noise metadata, and excluding the noise metadata from the filtered set of metadata. The metadata correspond to at least one of objects tracked within the video surveillance system or events within the video surveillance system. Means for generating one or more supplementary metadata elements based on the video content. Query processing means, communicatively coupled to the network interface means, the metadata processing means and the video processing means, for receiving a query of at least one of the metadata or the video content and processing the query according to one or more predefined rules.

An example of a computer program product according to the disclosure resides on a processor-executable computer storage medium and includes processor-executable instructions configured to cause a processor to obtain video content and metadata relating to the video content from multiple network devices; filter the metadata according to one or more criteria to obtain a filtered set of metadata; isolate video portions, of the video content, associated with respective first portions of the filtered set of metadata; and provide at least some of the filtered set of metadata or the isolated video portions to a cloud computing service.

Implementations of the computer program product may include one or more of the following features. The network devices comprise at least one of cameras or video encoders. The instructions configured to cause the processor to filter are further configured to cause the processor to evaluate quality of the metadata according to the one or more criteria, classify second portions of the metadata having a quality below a threshold as noise metadata, and exclude the noise metadata from the filtered set of metadata. The metadata correspond to at least one of objects tracked within the video surveillance system or events within the video surveillance system. Processor-executable instructions configured to cause the processor to receive a query of at least one of the metadata or the video content and process the query according to one or more predefined rules.

Items and/or techniques described herein may provide one or more of the following capabilities, as well as other capabilities not mentioned. Video content and metadata are provided to and processed by a cloud-based service, enabling oversight and operation of a security camera network from any location, including locations remote to the security camera network. Cloud-based security camera network management services can be utilized to enable a single consolidated interface for oversight and operation of multiple security camera networks in different geographic areas. Video content and metadata provided to the cloud storage facility are intelligently selected, significantly reducing the costs associated with data transfer. Network video and metadata processing algorithms can be utilized to provide enhanced video analytics by leveraging relationships between cameras in a system of managed security camera networks. A rule engine can be implemented to provide enhanced querying and retrieval of data provided to a cloud-based service. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
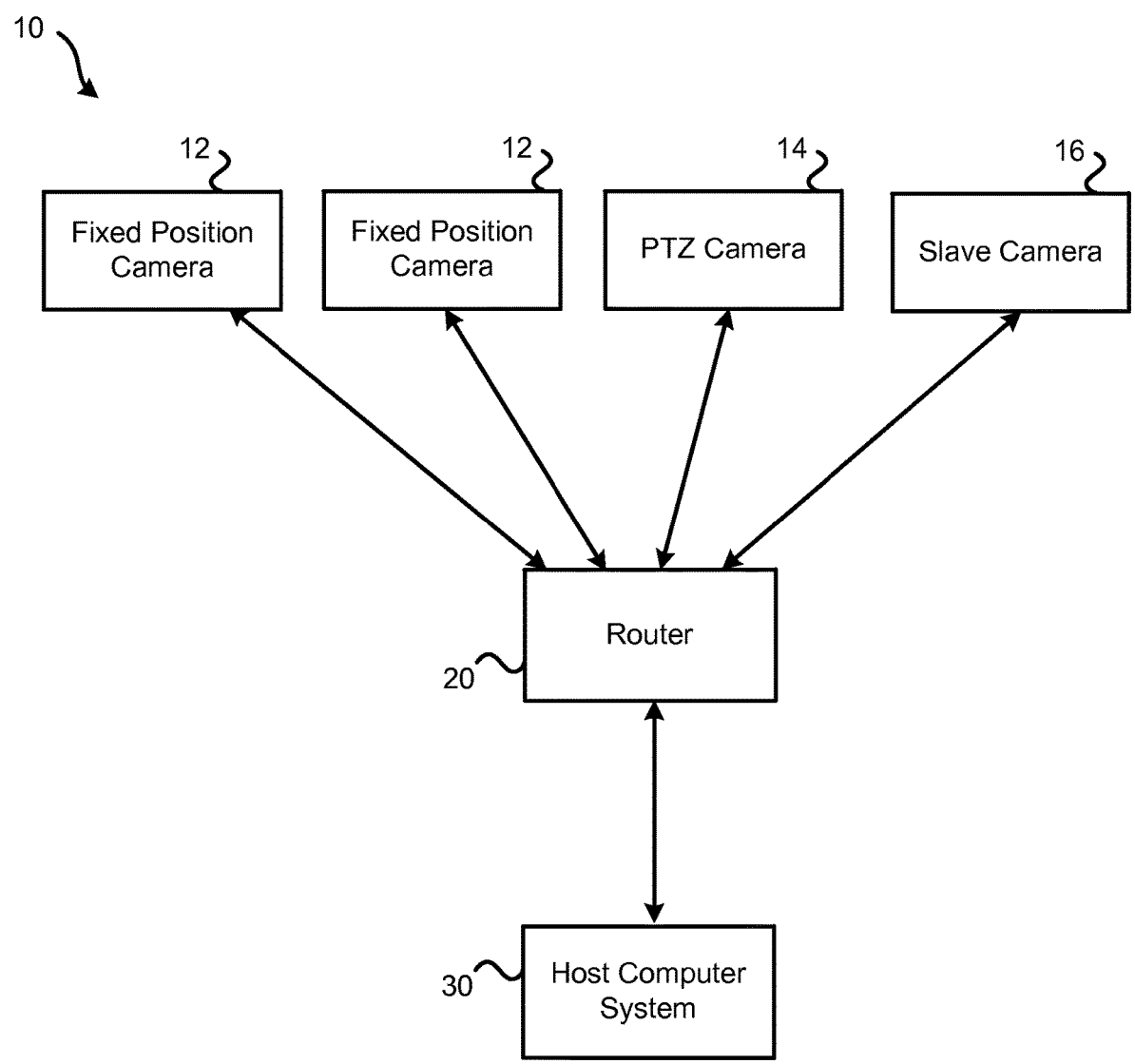
FIG. 1 is a block diagram of a security camera network.

Described herein are systems and methods for implementing and operating a cloud-based intelligent video surveillance management system. The video surveillance management system applies video analytics to extract metadata for video content provided to the system from various cameras and other associated devices. The video content and metadata are, in turn, used to assist video management operations such as event and alarm management and decision assistance.

Each camera in a camera network has an associated point of view and field of view. A point of view refers to the position and perspective from which a physical region is being viewed by a camera. A field of view refers to the physical region imaged in frames by the camera. Each camera is equipped with an imaging module, implemented as a complementary metal-oxide-semiconductor (CMOS) device and/or by other means, that generates images from received light, as well as a computational engine that takes images of a given resolution at a predefined rate (e.g., 30 images/second, etc.), compresses the image data using a visual compression algorithm and sends the compressed data over a local connection. A camera further includes, or is associated with, a digital signal processor (DSP) and associated software that manages operation of the camera. When the camera is powered on, the DSP begins to capture images using the functional modules described above. For each pixel in the field of view of the camera, the DSP maintains a mathematical model that describes an expected behavior of the particular pixel. For instance, for a camera mounted such that it captures images of a parking lot, one pixel position within the images captured by the camera may correspond to asphalt on the surface of the parking lot. The pixel has a static digital value that changes over time due to noise, lighting changes, and the like. The DSP models these variations over time as, e.g., a Gaussian distribution of a given mean and standard deviation. The DSP can generate similar models for pixels that change in a more complex manner, such as a pixel corresponding to a location on the side of a building that is at times obscured by a tree branch moving in the wind.

Based on background models for each pixel of a camera image, the DSP can process frames to determine whether a moving object is present within its field of view. The camera associates metadata with images of the moving object (referred to as an "object" for short). These metadata define various characteristics of the object. For instance, the metadata can define the location of the object within the camera's field of view, the width or height of the image of the object (e.g., measured in pixels), the direction the image of the object is moving, the speed of the image of the object, the color of the object, and/or a category of object. These are pieces of information that can be present in metadata associated with images of the object; other metadata is also possible. The category of object refers to a category, based on other characteristics of the object, that the object is determined to be within. For example, categories can include: humans, animals, cars, small trucks, large trucks, and/or SUVs. Metadata regarding events involving moving objects is also transmitted by the camera to the host computer system. Such event metadata includes: an object entering the field of view of the camera, an object leaving the field of view of the camera, the camera being sabotaged, the object remaining in the camera's field of view for greater than a threshold period of time (e.g., if a person is loitering in an area for greater than some threshold period of time), multiple moving objects merging (e.g., a running person jumps into a moving vehicle), a moving object splitting into multiple moving objects (e.g., a person gets out of a vehicle), an object entering an area of interest (e.g., a predefined area where the movement of objects is desired to be monitored), an object leaving a predefined zone, an object crossing a tripwire, an object moving in a direction matching a predefined forbidden direction for a zone or tripwire, object counting, object removal (e.g., when an object is still longer than a predefined period of time and its size is larger than a large portion of a predefined zone), object abandonment (e.g., when an object is still longer than a predefined period of time and its size is smaller than a large portion of a predefined zone), and a dwell timer (e.g., the object is still or moves very little in a predefined zone for longer than a specified dwell time).

Each camera transmits metadata associated with images of moving objects to a host computer system. Each camera also transmits frames of a video feed, possibly compressed, to the host computer system. The host computer system enables a user to view and analyze the video content and metadata. For instance, using the metadata received from multiple cameras, the host computer system can determine whether images of moving objects that appear (either simultaneously or non-simultaneously) in the fields of view of different cameras represent the same object. If a user specifies that this object is to be tracked, the host computer system displays to the user frames of the video feed from a camera determined to have a preferable view of the object. This tracking can also be performed using historical video feeds, referring to stored video feeds that represent movement of the object at some point in the past. As another example, a user can specify one or more rules, in response to which the host computer system returns video content and/or metadata that matches the specified rules. For instance, a user can request all video clips captured by the security camera network within a given time range that contain objects of a specified color. Other rules are also possible.

FIG. 1 illustrates a block diagram of a local security camera network 10. The security camera network 10 includes video cameras including fixed position cameras 12, PTZ (Pan-Tilt-Zoom) cameras 14, slave cameras 16, etc. Security camera networks may have zero, one, or more than one of each type of camera such that networks may have one or more cameras. For example, as shown in FIG. 1, the security camera network 10 includes two fixed position cameras 12, one PTZ camera 14 and one slave camera 16. Other quantities and/or configurations of cameras could also be used.

The security camera network 10 also includes a router 20. The fixed position cameras 12, PTZ cameras 14, and slave cameras 16 communicate with the router 20 using a wired connection (e.g., a local area network (LAN) connection) or a wireless connection. The router 20 communicates with a computing system, such as a host computer system 30. The router 20 communicates with the host computer system 30 using either a wired connection, such as a LAN connection, or a wireless connection. In some configurations, the host computer system 30 may be located at a single computing device and/or multiple computing devices (e.g., as a distributed computer system).

A fixed position camera 12 may be set in a fixed position, such as mounted to the eaves of a building to capture a video feed of the building's emergency exit. The field of view of such a fixed position camera, unless moved or adjusted by some external force, will remain unchanged. The fixed position camera 12 includes a digital signal processor (DSP) and/or one or more other processing entities to compress, process, and/or analyze images captured by the fixed position camera 12. For instance, as frames of the field of view of the fixed position camera 12 are captured, these frames are processed by a digital signal processor associated with the fixed position camera 12 to determine if one or more moving objects are present. For instance, a Gaussian mixture model may be used to separate a foreground that contains images of moving objects from a background that contains images of static objects, such as trees, buildings, and roads. The images of these moving objects are then processed to identify various characteristics of the images of the moving objects.

Using the images of respective detected objects, the fixed position camera 12 creates metadata associated with the images of each object. Metadata associated with, or linked to, an object contains information regarding various characteristics of the images of the object. For instance, the metadata includes information on characteristics such as: a location of the object, a height of the object, a width of the object, the direction the object is moving in, the speed the object is moving at, a color of the object, and/or a categorical classification of the object. Metadata may also include information regarding events involving moving objects.

Referring to the location of the object, the location of the object in the metadata is expressed as two-dimensional coordinates in a two-dimensional coordinate system associated with fixed position camera 12. These two-dimensional coordinates are associated with the position of the image of the object in the frames captured by the fixed position camera 12. The two-dimensional coordinates of the object may be determined to be a point within the frames captured by the fixed position camera 12. In some configurations, the coordinates of the position of the object is determined to be the middle of the lowest portion of the object (e.g., if the object is a person standing up, the position would be between the person's feet). The two-dimensional coordinates have an x and y component, but no third component.

In some configurations, the x and y components are measured in numbers of pixels. For example, a location of {613, 427} would mean that the middle of the lowest portion of the object is 613 pixels along the x-axis and 427 pixels along the y-axis of the field of view of the fixed position camera 12. As the object moves, the coordinates associated with the location of the object would change. Further, because this coordinate system is associated with the fixed position camera 12, if the same object is also visible in the fields of views of one or more other cameras, the location coordinates of the object determined by the other cameras would likely be different.

The height of the object may also be contained in the metadata and expressed in terms of numbers of pixels. The height of the object is defined as the number of pixels from the bottom of the image of the object to the top of the image of the object. As such, if the object is close to the fixed position camera 12, the measured height would be greater than if the object is further from the fixed position camera 12. Similarly, the width of the object is expressed in a number of pixels. The width of the objects can be determined based on the average width of the object or the width at the object's widest point that is laterally present in the image of the object. Similarly, the speed and direction of the object can also be measured in pixels.

The metadata determined by the fixed position camera 12 is transmitted to a host computer system 30 via a router 20. In addition to transmitting metadata to the host computer system 30, the fixed position camera 12 transmits a video feed of frames to the host computer system 30. Frames captured by the fixed position camera 12 can be compressed or uncompressed. Following compression, the frames are transmitted via the router 20 to the host computer system 30.

As further shown in FIG. 1, a security camera network 10 may include multiple fixed position cameras 12, which may function in a substantially similar manner to that described above. Fixed position cameras 12, assuming they are located in positions different from each other, have different points of view and fields of view. Thus, even if the same object is observed by multiple fixed position cameras 12 at the same instant in time, the perceived location, width and height of the object would vary between the different cameras.

The security camera network 10 also includes a PTZ camera 14. A PTZ camera 14 may pan, tilt, and zoom. As with the fixed position camera 12, the PTZ camera 14 can also include a digital signal processor and/or other processing devices. In order for the PTZ camera 14 to identify respective objects of interest, the PTZ camera 14 may have predefined points of view at which the PTZ camera 14 has analyzed the background and can distinguish the foreground containing moving objects from the background containing static objects. A user using the host computer system 30 may be able to control the movement and zoom of the PTZ camera 14. Commands to control the PTZ camera 14 may be routed from the host computer system 30 to the PTZ camera 14 via the router 20. In some configurations, the PTZ camera 14 follows a set pan, tilt, and zoom pattern unless interrupted by a command from the host computer system 30.

The slave camera 16 may communicate with the host computer system 30 via the router 20. The slave camera 16 can either be a fixed position camera or a PTZ camera. The slave camera 16 is configured only to capture images and is not capable of identifying objects in the captured images. Instead, the slave camera 16 transmits either raw frames of a video feed or compressed frames of the video feed (e.g., processed via a video compressor) to the host computer system 30 via the router 20. The host computer system 30 processes frames received from the slave camera 16 to identify and track moving objects in the frames received from the slave camera 16.

The host computer system 30 is configured to process information received by the cameras 12-16 via the router 20. For instance, the host computer system 30 can act as a location server which receives and stores locations of respective cameras 12-16 and/or other devices within the security camera network 10. The host computer system 30 computes locations of devices within the security camera network 10 based on information obtained from a user and/or the devices themselves, or alternatively devices within the security camera network 10 can compute their own locations and submit these locations to the host computer system 30. The host computer system 30 also identifies and tracks locations of respective objects monitored by the cameras 12-16.

As discussed above, the host computer system 30 receives and stores compressed and/or uncompressed video from the cameras 12-16. The host computer system 30 also receives, stores, and analyzes metadata received from the cameras 12-16. The host computer system 30 can provide a user terminal or other mechanisms that allow a user, such as a security guard, to interact with the frames of the video feeds received from the cameras and any generated metadata associated with the video feeds. A user terminal at the host computer system 30 can display one or more video feeds to the user at one time. The user can select an object to track using the user terminal. For example, if the user is viewing frames of the video feed from a fixed position camera 12 and an object the user wishes to track appears in the field of view of the fixed position camera 12, the user can select the image of the object. The host computer system 30 then leverages the positions of the cameras 12-16 of the security camera network 10 to track the object as it moves between the fields of view of the cameras 12-16. If the object is visible in the fields of view of multiple cameras, a preferable field of view is selected by the host computer system 30 based on predefined rules. The user can also control the PTZ camera 14 using the host computer system 30.

In some configurations, the host computer system 30 may be implemented by one computing device or multiple computing devices. For example, one computing device may process and store device locations, video, and function as a user terminal. Alternatively, a first computing device may function as a user terminal and interact (e.g., through the router 20) with a second computing device that processes location data, video content and/or metadata.

The local security camera network 10 is associated with a number of limitations. For instance, the security camera network 10 does not provide mobility of video; video content and associated data are available only at the host computer system 30, which is typically physically located in a local control room within the same site at which the cameras 12-16 are deployed. Further, the security camera network 10 operates as an insular system and is not configured to receive or utilize video content or other information corresponding to entities outside the local security camera network 10. Within the security camera network 10, the host computer system 30 may also not be capable of performing analytics for information associated with multiple cameras 12-16; instead, the host computer system 30 may provide only a user interface that enables an operator of the security camera network 10 to manually inspect and analyze data associated with multiple cameras 12-16.

Figure 2:
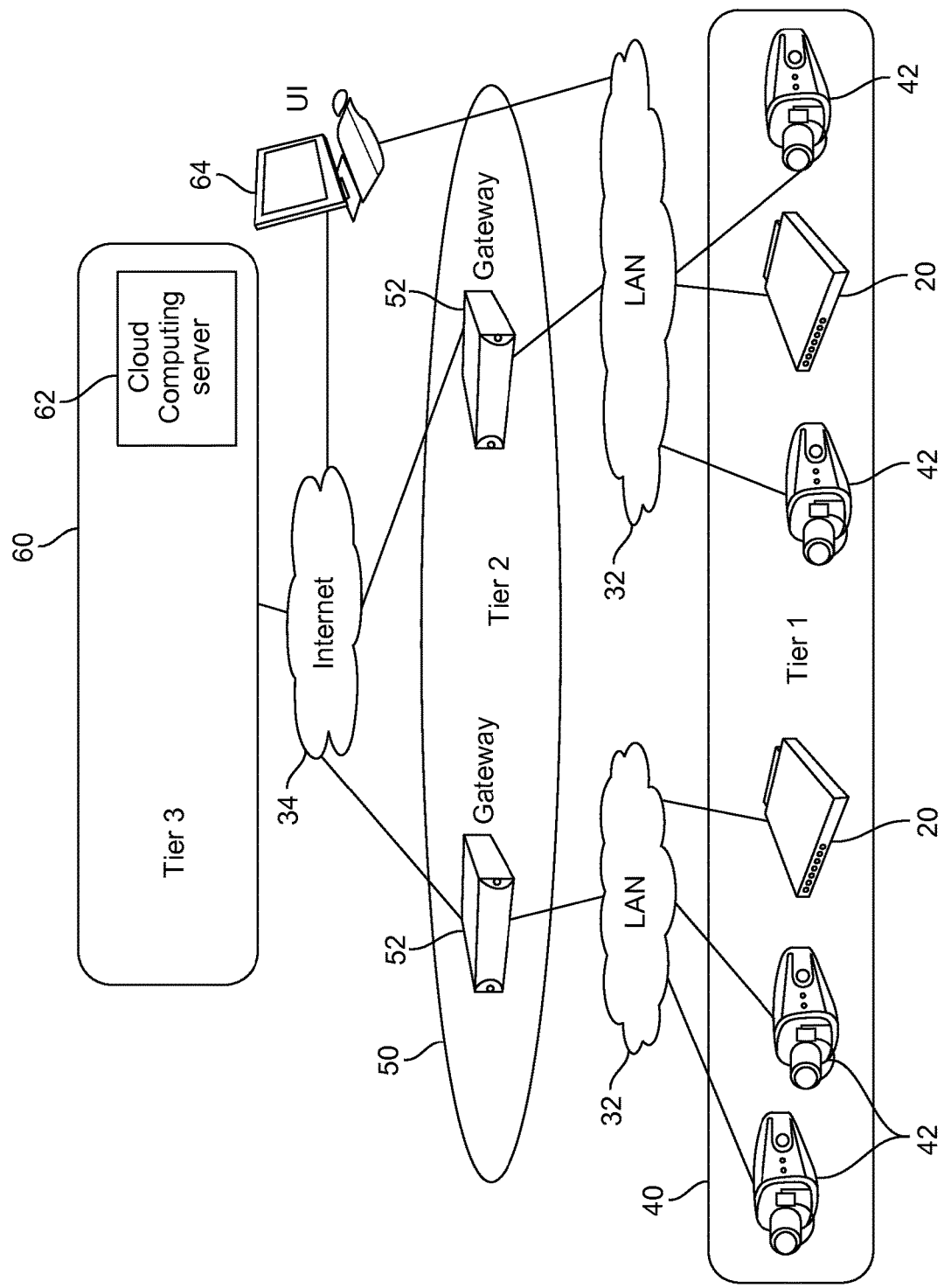
FIG. 2 is a diagram of a three-tier cloud-based video surveillance management system.

To increase the mobility and versatility of a video surveillance network and mitigate at least the shortcomings stated above, a video surveillance network can be designed using a multi-tiered structure to leverage cloud-based analysis and management services for enhanced functionality and mobility. Cloud-based services refers to computing services that are provided by and accessed from a network service provider via cloud computing. FIG. 2 illustrates an example of a three-tier cloud-based system for intelligent video surveillance system management. The first tier 40 of the system includes edge devices such as routers 20, intelligent encoders and intelligent cameras 42 with embedded video analytics algorithms. The cameras 42 in FIG. 2 operate similarly to cameras 12-16 in FIG. 1. The first tier 40 of the system connects to the second tier 50 of the system through one or more LANs 32. The second tier 50 of the system is at the gateway of the surveillance system and includes one or more gateway devices 52 that operate as described in further detail below. The second tier 50 of the system connects via the Internet 34 to the third tier 60 of the system, which includes cloud computing services provided via a cloud computing server 62 and/or other entities. As further shown by FIG. 2, a computer system 64 can be configured to access information associated with the system via the LAN(s) 32 and/or the Internet 34. The computer system 64 includes a user interface (UI) as well as various functional modules to enable an operator to query, process and view data associated with the system in an intelligent manner. As the system is cloud-based and operates via the Internet 34, the computer system 64 may be located in any suitable location and need not be co-located with any particular edge device(s) or gateway(s) associated with the system.

Figure 3:
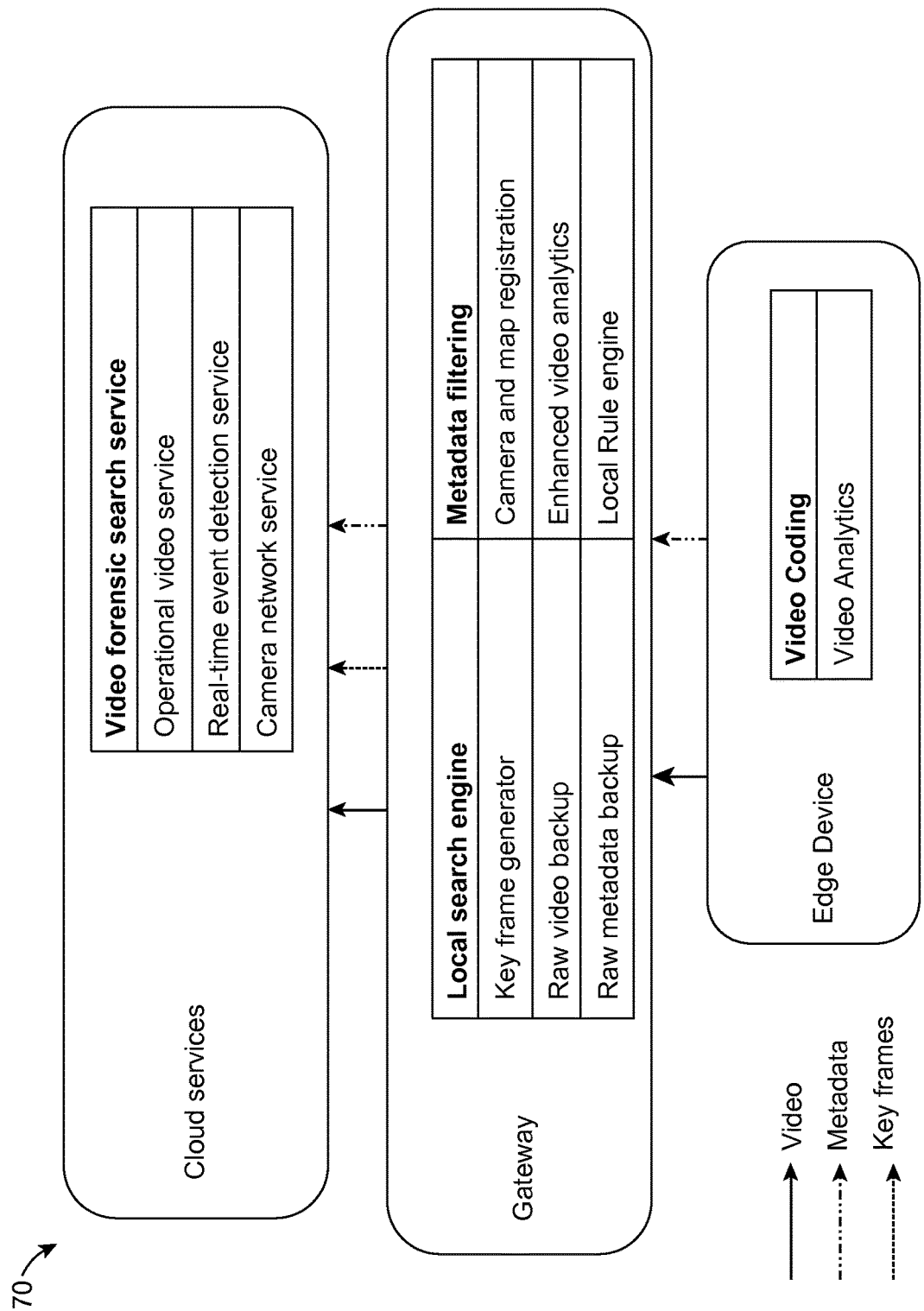
FIG. 3 is a diagram illustrating enhanced functionality provided by the video surveillance management system of FIG. 2.

Various aspects of the functionality of the system shown in FIG. 2 are illustrated by diagram 70 in FIG. 3. Within the intelligent cameras/encoders, a video analytics algorithm is utilized as a scene analyzer to detect and track objects in the scene and generate metadata to describe the objects and their events. The scene analyzer operates as a background subtraction based algorithm. The scene analyzer can describe an object with its color, location in the scene, time stamp, velocity, size, moving direction, etc. The scene analyzer can also trigger predefined metadata events such as zone or tripwire violation, counting, camera sabotage, object merging, object splitting, still objects, object loitering, etc. Object and event metadata, along with any other metadata generated by the edge device(s), are sent to the gateway 52.

The gateway 52 is a storage and processing device in the local network which stores video and metadata content. The gateway can be wholly or in part implemented as a network video recorder or an independent server. As stated above, metadata generated from edge devices are provided to their corresponding gateway 52. In turn, the gateway 52 uploads video captured from the cameras 42 to the cloud computing server 62 for storage, display, and search. Since the volume of the video captured by the cameras 42 is significantly large, it may be prohibitively expensive in terms of cost and bandwidth to upload all the video content associated with the cameras 42. Thus, the gateway 52 is utilized as described below to reduce the amount of video sent to the cloud computing server 62. As a result of metadata filtering and other operations described below, the amount of information sent to the cloud computing server 62 from the gateway 52 can be reduced significantly (e.g., to a few percent of the information that would be sent to the cloud computing server 62 if the system sent all information continuously). In addition to cost and bandwidth savings, this reduction improves the scalability of the system, enabling a common platform for monitoring and analyzing surveillance networks across a large number of geographic areas from a single computing system 64 via the cloud computing server 62.

The metadata provided by the edge devices is processed at the gateway 52 to remove noise and reduce duplicated objects. Key frames of video content obtained from the edge devices can also be extracted based on metadata time stamps and/or other information associated with the video and stored as still pictures for post-processing. The recorded video and still pictures can be further analyzed to extract information that is not obtained from the edge devices using enhanced video analytics algorithms on the gateway 52. For instance, algorithms such as face detection/recognition and license plate recognition can be executed at the gateway 52 to extract information based on motion detection results from the associated cameras 42. An enhanced scene analyzer can also be run at the gateway 52, which can be used to process high definition video content to extract better object features.

By filtering noisy metadata, the gateway 52 reduces the amount of data uploaded to the cloud computing servers 62. Conversely, if the scene analyzer at the gateway 52 is not configured correctly, it is possible that a lot of noises will be detected as objects and sent out as metadata. For instance, foliage, flags and some shadows and glares can generate false objects at the edge devices, and it is conventionally difficult for these edge devices to detect and remove such kinds of noise in real time. However, the gateway 52 can leverage temporal and spatial information across all cameras 42 and/or other edge devices in the local surveillance network to filter these noise objects with less difficulty. Noise filtering can be implemented at an object level based on various criteria. For instance, an object can be classified as noise if it disappears soon after it appears, if it changes moving direction, size, and/or moving speed, if it suddenly appears and then stands still, etc. If two cameras have an overlapped area and they are registered to each other (e.g., via a common map), an object identified on one camera can also be identified as noise if it cannot be found at the surrounding area of the location on the other camera. Other criteria may also be used. Detection of noise metadata as performed above can be based on predefined thresholds; for example, an object can be classified as noise if it disappears within a threshold amount of time from its appearance or if it exhibits more than a threshold change to direction, size and/or speed.

By classifying objects as noise as described above, the gateway 52 is able to filter out most of the false motion information provided by the edge devices before it is sent to the cloud. For instance, the system can register cameras 42 on a map via a perspective transformation at the gateway 52, and the feature points of the scene can be registered with the corresponding points on the map. This approach enables the system to function as a cross-camera surveillance monitoring system. Since objects can be detected from multiple cameras 42 in the areas at which the cameras 42 overlap, it is possible to use this information to remove noise from metadata objects.

As another example, the gateway 52 can leverage temporal relationships between objects in a scene monitored by edge devices to facilitate consistency in object detection and reduce false positives. Referring again to the example of a camera observing a parking lot, an edge device may generate metadata corresponding to a person walking through the parking lot. If the full body of the person is visible at the camera, the camera generates metadata corresponding to the height of the person. If subsequently, however, the person walks between rows of cars in the parking lot such that his lower body is obscured from the camera, the camera will generate new metadata corresponding to the height of only the visible portion of the person. As the gateway 52 can intelligently analyze the objects observed by the camera, the gateway 52 can leverage temporal relationships between observed objects and pre-established rules for permanence and feature continuity to track an object even if various portions of the object become obscured.

After filtering noisy metadata objects and performing enhanced video analytics as described above, the remaining metadata objects and associated video content are uploaded by the gateway 52 to a cloud computing service. As a result of the processing at the gateway 52, only video clips associated with metadata will be uploaded to the cloud. This can significantly reduce (e.g., by 90% or more) the amount of data to be transmitted. The raw video and metadata processed by the gateway 52 may also be locally stored at the gateway 52 as backup. The gateway 52 may also transmit representations of video content and/or metadata to the cloud service in place of, or in addition to, the content or metadata themselves. For instance, to further reduce the amount of information transmitted from the gateway 52 to the cloud corresponding to a tracked object, the gateway 52 may transmit coordinates or a map representation of the object (e.g., an avatar or other marking corresponding to a map) in place of the actual video content and/or metadata.

The video uploaded to the cloud computing server 62 can be transcoded with a lower resolution and/or frame rate to reduce video bandwidth on the Internet 34 for a large camera network. For instance, the gateway 52 can convert high-definition video coded in a video compression standard to a low-bandwidth video format in order to reduce the amount of data uploaded to the cloud.

By utilizing the cloud computing service, users associated with the system can watch and search video associated with the system anywhere at any time via a user interface provided at any suitable fixed or portable computing device 64. The user interface can be web-based (e.g., implemented via HTML 5, Flash, Java, etc.) and implemented via a web browser, or alternatively the user interface can be provided as a dedicated application on one or more computing platforms. The computing device 64 may be a desktop or laptop computer, tablet computer, smartphone, personal digital assistant (PDA) and/or any other suitable device.

Additionally, use of cloud computing services provided enhanced scalability to the system. For instance, the system can be utilized to integrate a wide network of surveillance systems corresponding to, e.g., different physical branches of a corporate entity. The system enables a user at a single computing device 64 to watch and search video being uploaded to the cloud service from any of the associated locations. Further, if a system operator desires to search a large amount of cameras over a long period of time, the cloud service can execute the search on a cluster of computers in parallel to speed up the search. The cloud computing server 62 can also be operable to efficiently provide a wide range of services such as a forensic search service, operational video service, real-time detection service, camera network service, or the like.

Figure 4:
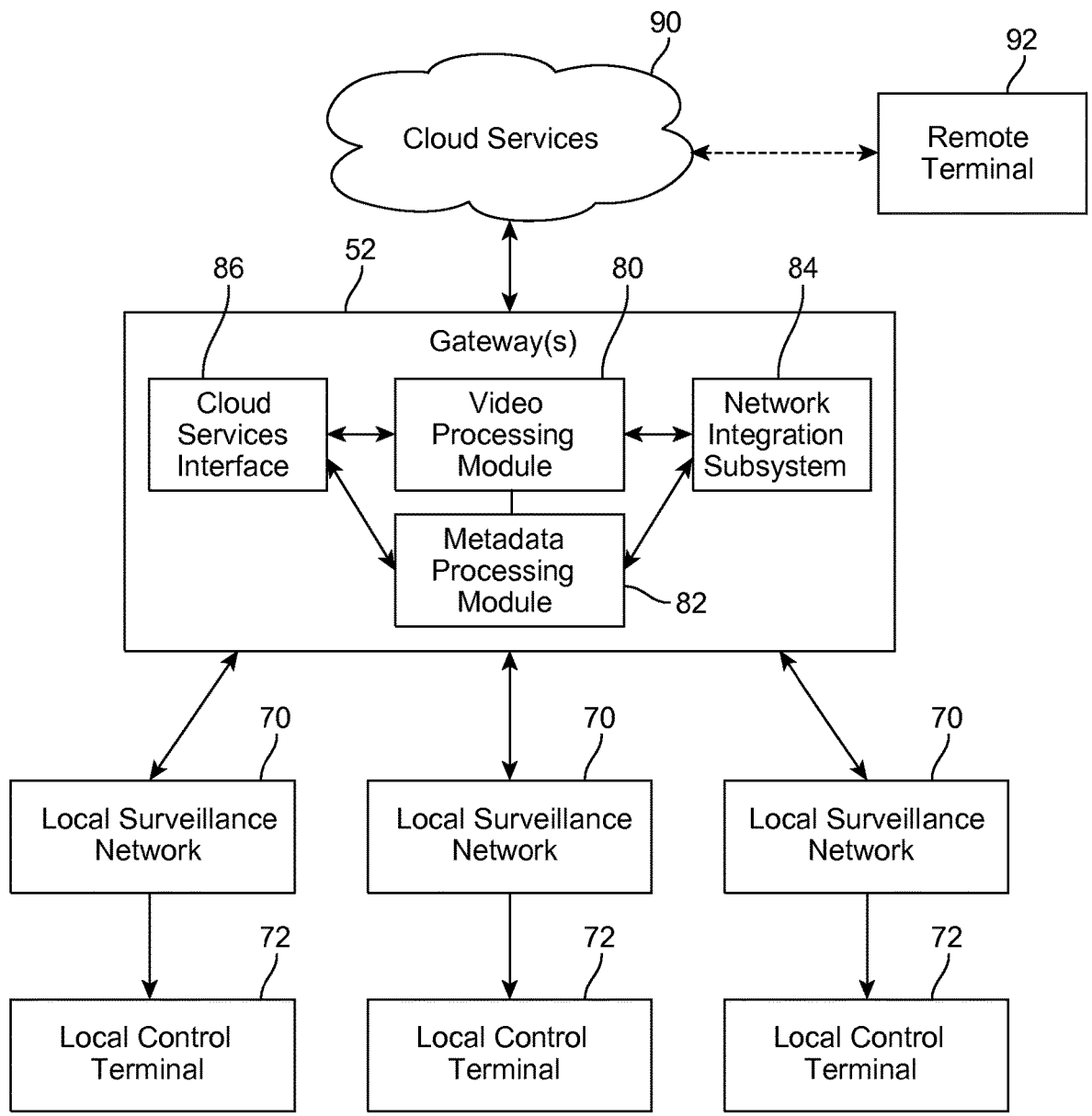
FIG. 4 is a block diagram of a system for managing a set of video surveillance networks.

FIG. 4 illustrates a system for managing a set of local video surveillance networks 70 according to the techniques described herein. The local surveillance networks 70 can each include edge devices such as cameras 42, routers 20 or the like as discussed above. The local surveillance networks 70 each provide video content and associated metadata to gateway(s) 52 over local network connections. The gateway 52 utilizes a video processing module 80 and a metadata processing module 82, which can operate as described above to analyze, filter and/or generate metadata associated with the local surveillance networks 70. To provide for intelligent metadata and video analytics, the gateway 52 utilizes a network integration subsystem 84 that integrates data obtained from various local surveillance networks 70, as well as edge devices within a given local surveillance network 70. The gateway 52 additionally utilizes a cloud services interface 86, which selectively uploads video content and metadata to a cloud service 90 as described above.

Upon uploading information to the cloud service 90, a user can interact with the uploaded data via a remote terminal 92. The centralized nature of the cloud service 90 can enable enhanced analysis and search operations. For instance, a user can perform a video forensics search via the remote terminal 92 based on various criteria. As an example, a user can query the cloud service 90 for objects detected by the local surveillance networks 70 corresponding to a man six feet in height wearing blue jeans and a red shirt between 3:00 PM and 5:00 PM on a given day. In response to the query, the cloud service 90 searches within its stored metadata to find matching objects. If matching objects are found, the cloud service 90 returns data relating to the objects and/or selected video clips corresponding to the objects.

The cloud service 90 can operate in combination with local systems at the local surveillance networks 70. For instance, in the example above, a local surveillance network 70 can store full video and metadata such that a user desiring additional information than that available at the cloud service 90 can access more detailed information from a local control terminal 72 associated with the given local surveillance network 70. While not illustrated in FIG. 4, local control terminals 72 may interact with and/or incorporate some or all analytical functionality of the gateway(s) 52 to enable advanced video and/or metadata analytics with respect to various edge devices within the local surveillance network 70 or other local surveillance networks 70.

Figure 5:
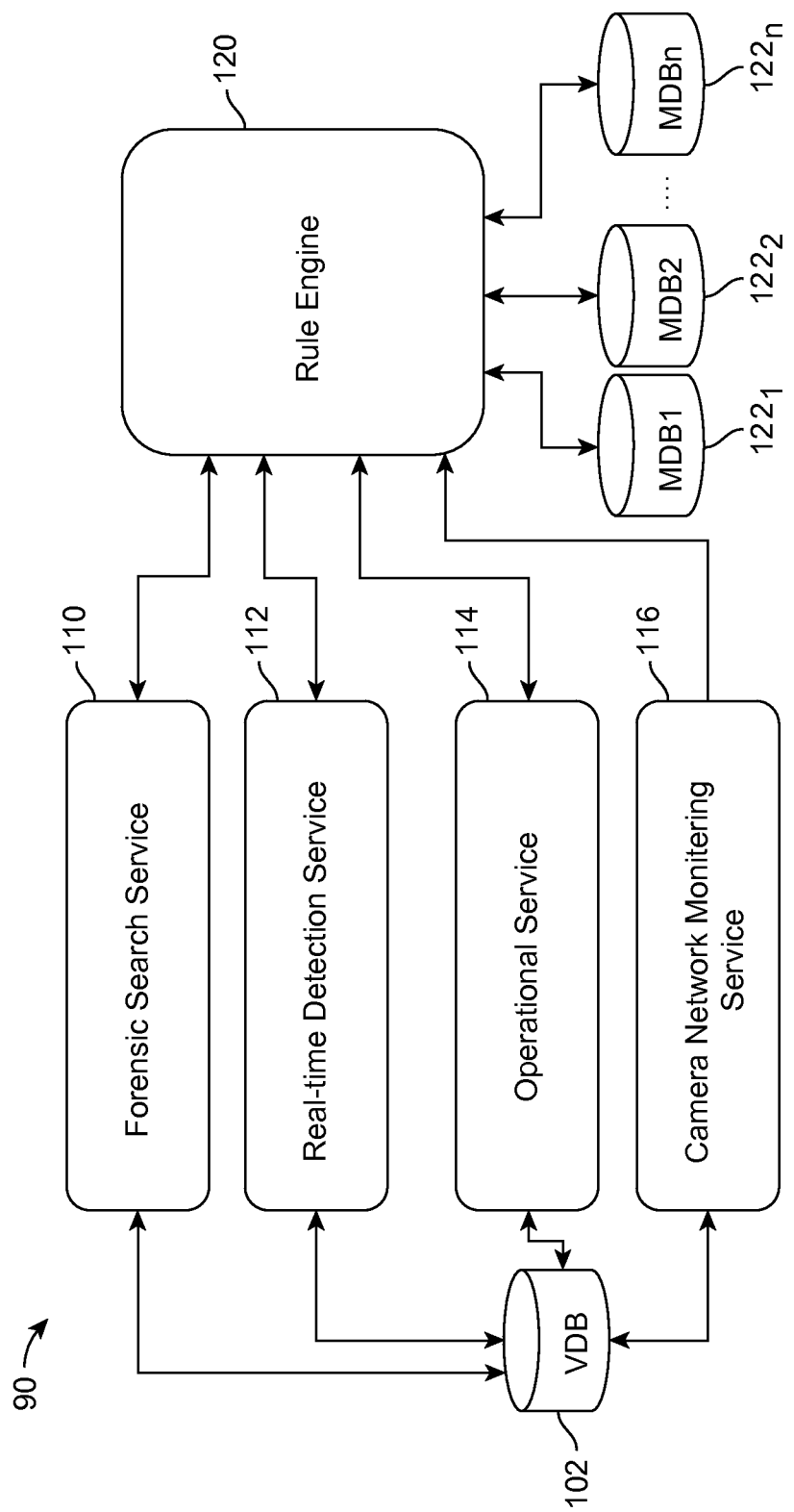
FIG. 5 is a diagram illustrating cloud computing services provided by a cloud-based video surveillance management system.

FIG. 5 illustrates a functional hierarchy employed by the cloud service 90 based on a rule engine 120. The functionality illustrated by FIG. 5 is one example of a functional implementation of the cloud service 90; other implementations are also possible. As described above, the cloud service 90 can implement one or more services such as a forensic search service 110, a real-time detection service 112, an operational service 114, a camera network monitoring service 116, etc. The cloud service 90 performs one or more operations with respect to an associated video database (VDB) 102 and/or one or more associated metadata databases (MDB) 122.

The rule engine 120 processes rules defined by users, which can use visual features, time, location, velocity, moving direction, object relationships, and other criteria to query associated databases. The rule engine 120 can use logical expression to combine multiple simple rules to construct a more complicated rule. For example, a rule can be defined to trigger an alarm if a person crosses a second predefined region of interest within five seconds of touching a first predefined region of interest. The input features can have a range for each feature to be searched.

The services 110-116 implemented within the cloud service 90 communicate with the rule engine 120 using standard application programming interfaces (APIs). For the forensic search service 110, the rule engine 120 determines the best matched metadata to a given query from MDB(s) 122 stored and indexed on the cloud via searching and sorting. These searching and sorting operations can be scalable and hierarchical. For instance, local searching and sorting can be conducted on different servers with given distributed datasets, and the selected results can be merged together to be sorted again on a higher level server. This process continues until it reaches the top level server, at which time the final results are given by sorting the final results. The forensic search service 110 communicates with the rule engine 120 to obtain query results, retrieve corresponding key frames and video clips, and deliver the result to a user.

For the real-time detection service 112, the rule engine 120 checks associated metadata in real-time to determine whether events are presently occurring that meet predefined rules. If so, the real-time detection service 112 triggers alarms for the certain types of events that are detected. For the operational service 114, the rule engine 120 assists in providing results of statistical data, (e.g., a list of average counts of objects visiting a specific place, such as a lane in a department store, in a predefined time period, etc.). For the camera network monitoring service 116, the rule engine 120 assists in displaying user selected or system identified objects automatically. The camera network monitoring service 116 manages multiple cameras, which can have overlapping or non-overlapping monitoring areas. The video on the display can be switched automatically to track suspects and/or other objects of interest. Further, moving objects can be labeled on a map registered with the camera scenes.

Figure 6:
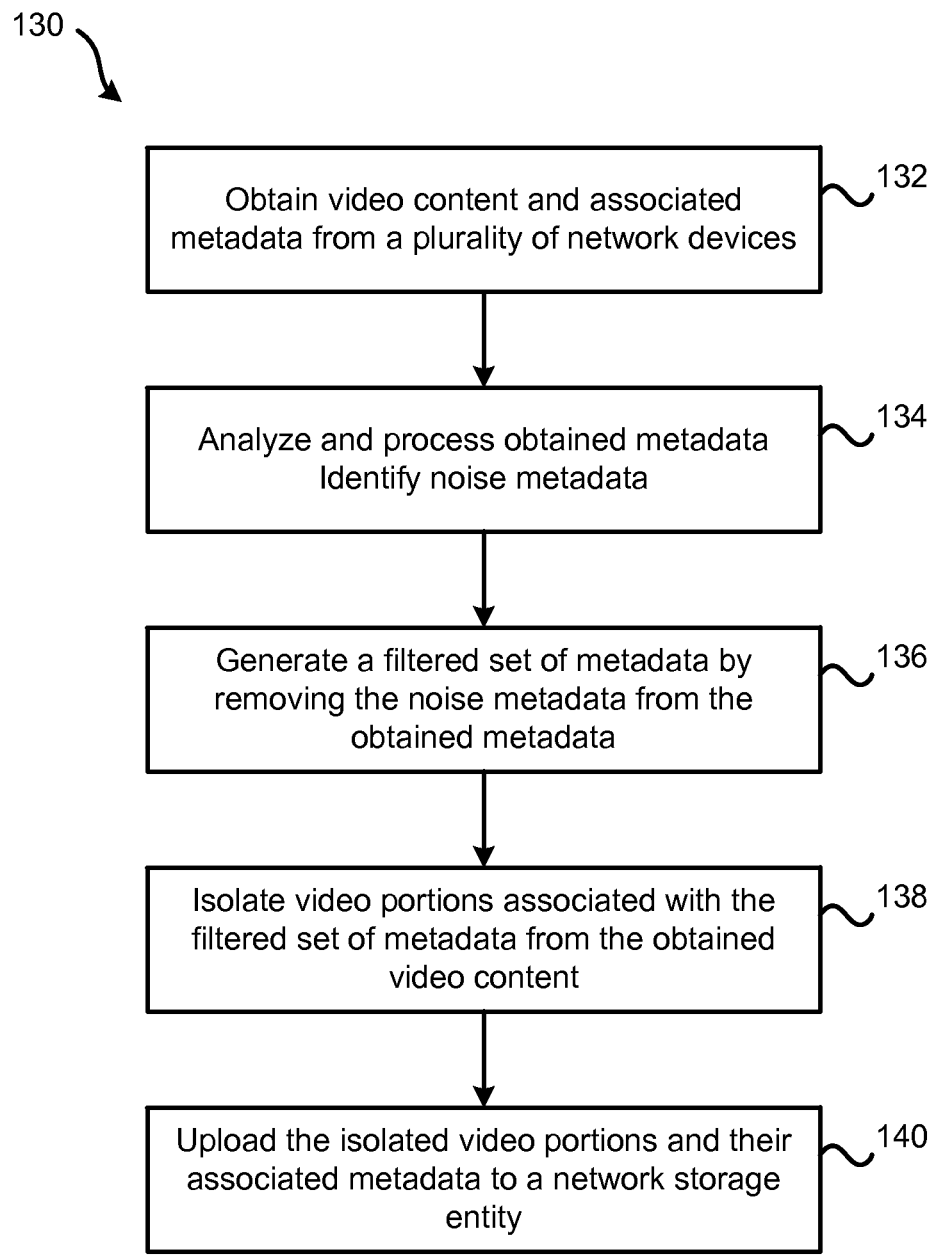
FIGS. 6-7 are block flow diagrams of processes for managing transfer of information associated with a video surveillance system to a network management service.

Referring next to FIG. 6, with further reference to FIGS. 1-5, a process 130 of managing transfer of information associated with a video surveillance system to a network management service, such as a cloud service 90, includes the stages shown. The process 130 is, however, an example only and not limiting. The process 130 can be altered, e.g., by having stages added, removed, rearranged, combined, and/or performed concurrently. Still other alterations to the process 130 as shown and described are possible. The process 130 can be performed by one or more entities associated with a multi-tiered surveillance management system, such as a gateway 52 interposed between a cloud service 90 and local surveillance systems 70. One or more of the operations described in process 130 can be performed in hardware and/or in software.

The process 130 begins at stage 132, wherein video content and associated metadata are obtained from a plurality of network devices (e.g., edge devices such as routers 20, cameras 42, encoders, etc.). At stage 134, the obtained metadata are analyzed and processed, and noise metadata are identified. "Noise" metadata is defined as any metadata generated by a network device that does not correspond to an actual event or object. These can include, e.g., false positives identified by a network device due to background image noise, metadata identified by a gateway 52 as extraneous upon performing inter-camera analytics or temporal relationship processing, etc. The noise metadata can be identified by, for example, evaluating quality of the metadata according to one or more criteria as described above and classifying portions of the metadata having a quality below a given threshold as noise metadata. At stage 136, a filtered set of metadata is generated by removing the noise metadata identified at stage 134 from the metadata obtained at stage 132.

At stage 138, video portions associated with first portions of the set of filtered metadata generated at stage 136 are isolated from the video content obtained at stage 132. At stage 140, the video portions isolated at stage 138 and their associated metadata are uploaded to a network storage entity (e.g., associated with a cloud service 90).

Figure 7:
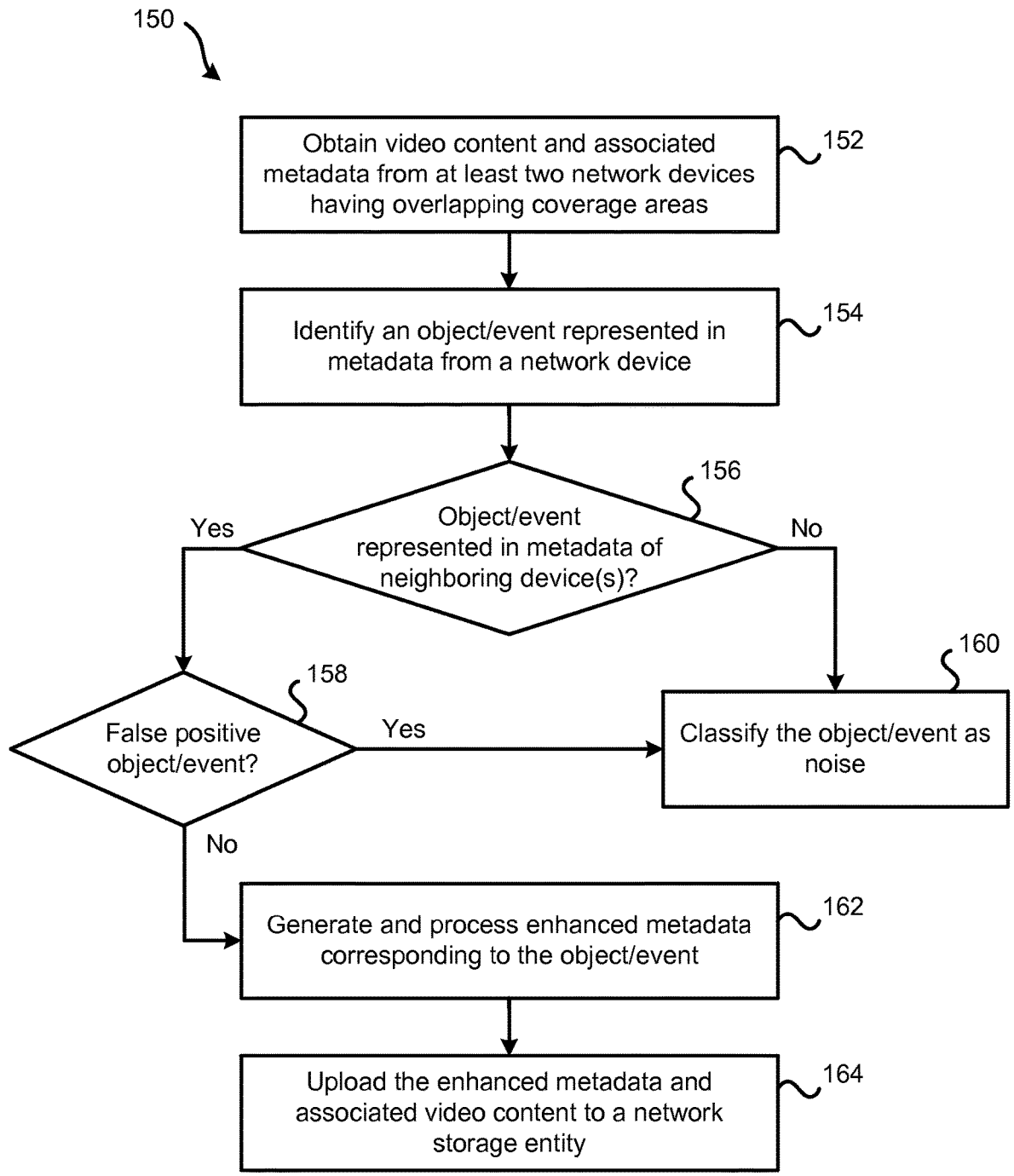

Referring to FIG. 7, with further reference to FIGS. 1-5, a second process 150 of managing transfer of information associated with a video surveillance system to a network management service includes the stages shown. The process 150 is, however, an example only and not limiting. The process 150 can be altered, e.g., by having stages added, removed, rearranged, combined, and/or performed concurrently. Still other alterations to the process 150 as shown and described are possible. Similar to the process 130, the process 150 can be performed by one or more entities associated with a multi-tiered surveillance management system, such as a gateway 52 interposed between a cloud service 90 and local surveillance systems 70. One or more of the operations described in process 150 can be performed in hardware and/or in software.

The process 150 begins at stage 152, wherein video content and associated metadata are obtained from at least two network devices (e.g., cameras 42, encoders, etc.) having overlapping coverage areas. At stage 154, an object or event represented in the metadata obtained at stage 152 is identified. At stage 156, it is determined whether the object or event is represented in the metadata of one or more neighboring devices that also provide coverage for the area of the object or event. If the object or event is not represented in these metadata, the object or event is classified as noise at stage 160. Otherwise, at stage 158, it is further determined whether the object or event is a false positive (e.g., based on spatial/temporal relationships between devices and associated metadata, etc.). The object or event is classified as noise at stage 160 if a false positive is detected; otherwise, at stage 162, enhanced metadata corresponding to the object or event are generated. The enhanced metadata can be generated using one or more services associated with a gateway 52 as described above.

At stage 164, the enhanced metadata generated at stage 162 and associated video content are uploaded to a network storage entity (e.g., associated with a cloud service 90). Once information is uploaded to the network storage entity, one or more cloud services (e.g., cloud services 110-116 and/or rule engine 120) can be utilized to generate enhanced metadata in addition to, or in place of, enhanced metadata generated at stage 162.

Figure 8:
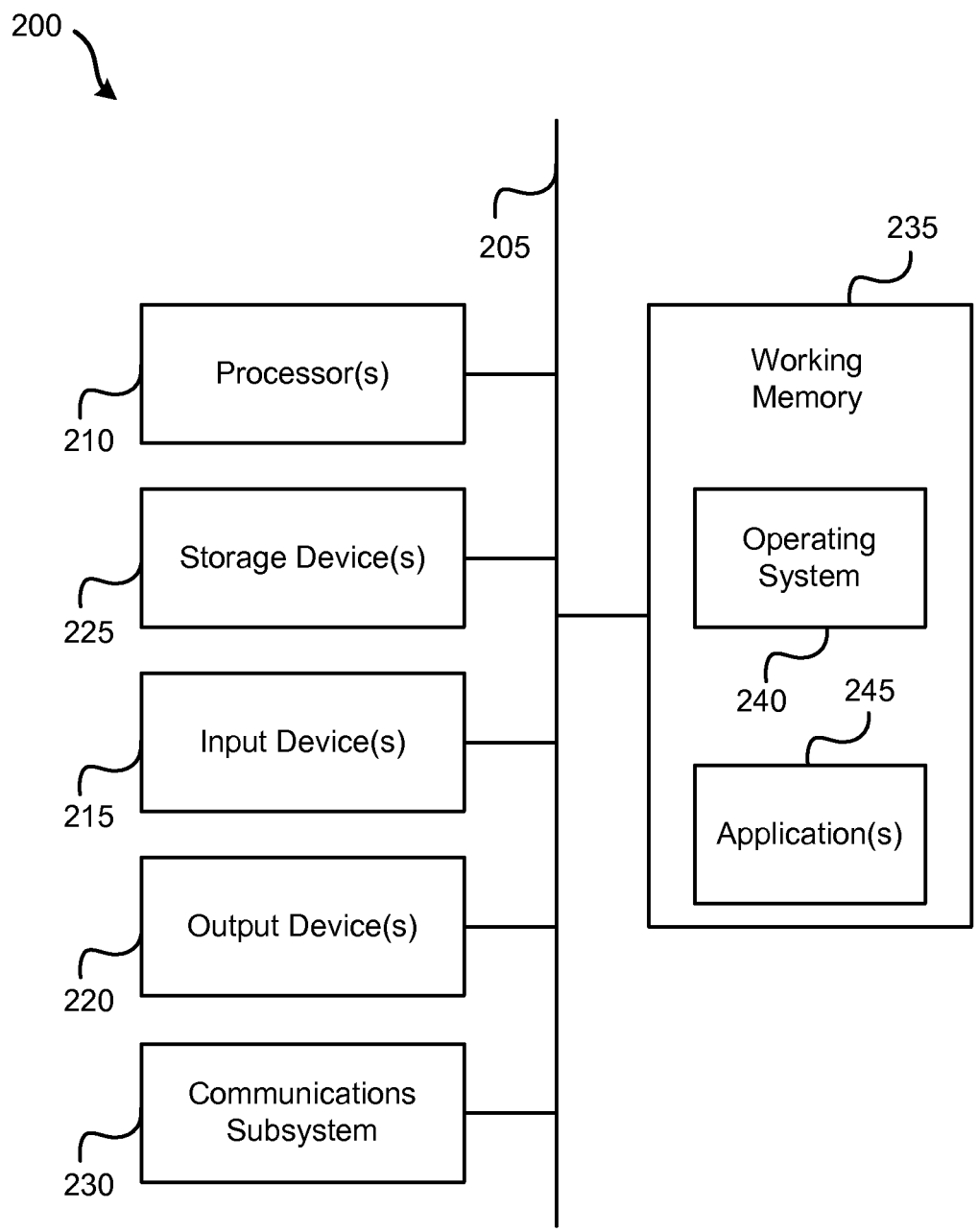
FIG. 8 illustrates a block diagram of an embodiment of a computer system.

To perform the actions of the host computer system 30, the gateway(s) 52, the computing system 64, the remote terminal 92, various elements of the cloud service 90, or any other previously described computerized system(s), a computer system as illustrated in FIG. 8 may be used. FIG. 8 provides a schematic illustration of a computer system 200 that can perform the methods provided by various other configurations, as described herein, and/or can function as the host computer system, a remote kiosk/terminal, a point-of-sale device, a mobile device, and/or a computer system. FIG. 8 provides a generalized illustration of various components, any or all of which may be utilized as appropriate. FIG. 8, therefore, broadly illustrates how individual system elements may be implemented in a relatively separated or relatively more integrated manner.

The computer system 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a mouse, a keyboard and/or the like; and one or more output devices 220, which can include without limitation a display device, a printer and/or the like.

The computer system 200 may further include (and/or be in communication with) one or more non-transitory storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 230 may permit data to be exchanged with a network (such as the network described below, to name one example), other computer systems, and/or any other devices described herein. In many configurations, the computer system 200 will further comprise a working memory 235, which can include a RAM or ROM device, as described above.

The computer system 200 also can comprise software elements, shown as being currently located within the working memory 235, including an operating system 240, device drivers, executable libraries, and/or other code, such as one or more application programs 245, which may comprise computer programs provided by various configurations, and/or may be designed to implement methods, and/or configure systems, provided by other configurations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computer system, such as the system 200. In other configurations, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.), then takes the form of executable code.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations may employ a computer system (such as the computer system 200) to perform methods in accordance with various configurations of the invention. According to a set of configurations, some or all of the procedures of such methods are performed by the computer system 200 in response to processor 210 executing one or more sequences of one or more instructions (which might be incorporated into the operating system 240 and/or other code, such as an application program 245) contained in the working memory 235. Such instructions may be read into the working memory 235 from another computer-readable medium, such as one or more of the storage device(s) 225. Merely by way of example, execution of the sequences of instructions contained in the working memory 235 might cause the processor(s) 210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 200, various computer-readable media might be involved in providing instructions/code to processor(s) 210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 225. Volatile media include, without limitation, dynamic memory, such as the working memory 235. Transmission media include, without limitation, coaxial cables, copper wire and fiber optics, including the wires that comprise the bus 205, as well as the various components of the communication subsystem 230 (and/or the media by which the communications subsystem 230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various configurations of the invention.

The communications subsystem 230 (and/or components thereof) generally will receive the signals, and the bus 205 then might carry the signals (and/or the data, instructions, etc. carried by the signals) to the working memory 235, from which the processor(s) 205 retrieves and executes the instructions. The instructions received by the working memory 235 may optionally be stored on a storage device 225 either before or after execution by the processor(s) 210.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details techniques in the context of a security camera system. However, the systems and methods described herein may be applicable to other forms of camera systems.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" includes A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of managing a network-based video surveillance system through a computing system in a gateway between a plurality of network devices and a cloud computing service for reducing the amount of video data received by the cloud computing service, the method comprising:
   obtaining video content and metadata relating to the video content from a plurality of network devices including first and second network devices that maintain at least some metadata for overlapping geographic areas;
   filtering the metadata according to one or more criteria to obtain a filtered set of metadata, wherein filtering the metadata comprises:
      identifying a metadata element obtained from the first network device that corresponds to the area for which the first network device and the second network device maintain the at least some metadata elements;
      evaluating quality of the identified metadata element according to the one or more criteria;
      classifying at least a portion of the metadata element as noise metadata when the evaluated quality it is below a threshold of the one or more criteria;
      determining whether a metadata element corresponding to the metadata element having at least a portion classified as noise has been obtained from the second network device;
      identifying the metadata element obtained from the first network device as noise if the metadata element corresponding to the metadata element having at least a portion classified as noise has not been obtained from the second network device; and
      excluding from the filtered set any metadata element identified as noise to create a noise filtered set of metadata;
   determining video frames that are each associated with the noise filtered set of metadata; and
   uploading to a cloud computing service at least one of the noise filtered set of metadata or the video frames exclusively associated with the noise filtered set of metadata.

2. The method of claim 1 wherein the plurality of network devices comprise at least one of cameras or video encoders.

3. The method of claim 1 wherein respective ones of the plurality of network devices are associated with respective ones of a plurality of local networks, and wherein each of the plurality of local networks is associated with distinct geographic locations.

4. The method of claim 1, wherein the filtering further comprises evaluating the quality of the metadata based on at least one of spatial relationships within video content corresponding to the metadata or temporal relationships within the video content corresponding to the metadata.

5. The method of claim 1 further comprising processing the video content to generate one or more supplementary metadata elements.

6. The method of claim 1 further comprising:
   receiving a query of at least one of the metadata or the video content; and
   processing the query according to one or more predefined rules.

7. The method of claim 1, further comprising:
maintaining in the filtered set a metadata element for an object that becomes partially or fully obscured, in accordance with temporal relationships between observed objects and pre-defined for permanence and feature continuity.

8. The method of claim 1, wherein the excluding excludes from the filtered set of metadata at least one metadata element for at least one object classified as noise in response to the at least one object disappearing from the video content within a threshold amount of time from appearing in the video content.

9. The method of claim 1, wherein filtering the metadata further includes excluding from the filtered set at least one metadata element from the video data from at least one of the at least two neighboring network devices from the plurality of network devices for at least one object determined to be a duplicate of an object in video data from another of the at least two neighboring network devices.

10. The method of claim 1, wherein a map representation of an object for either the first portions of the filtered set of metadata or the video frames associated with the respective first portions of the filtered set of metadata is uploaded to the cloud computing service in place of the video content or metadata.

11. The method of claim 10, further comprising: storing, as a backup at the gateway, at least the video content and metadata associated with the representation to be uploaded.

12. The method of claim 1, wherein the metadata element corresponds to an object or event detected from respective video content.

13. A network-based video surveillance management system comprising:
a gateway configured to obtain video content and metadata relating to the video content from a plurality of network devices including first and second network devices that maintain at least some metadata for overlapping geographic areas;
a metadata processing module communicatively coupled to the gateway and configured to filter the metadata according to one or more criteria to obtain a filtered set of metadata, wherein the metadata processing module configured to filter the metadata is configured to:
identify a metadata element obtained from the first network device that corresponds to the area for which the first network device and the second network device maintain the at least some metadata elements;
evaluate a quality of the identified metadata according to the one or more criteria;
classify at least a portion of the metadata having as noise metadata when the evaluated quality is below a threshold of the one or more criteria;
determine whether a metadata element corresponding to the metadata element having at least a portion classified as noise has been obtained from the second network device;
identify the metadata element obtained from the first network device as noise if the metadata element corresponding to the metadata element having at least a portion classified as noise has not been obtained from the second network device; and
exclude from the filtered set any metadata element identified as noise to create a noise filtered set of metadata;
a video processing module communicatively coupled to the gateway and the metadata processing module and configured to determine video frames that are each associated with the noise filtered set of metadata; and
a cloud services interface communicatively coupled to the gateway, the metadata processing module and the video processing module, the cloud service interface configured to upload to a cloud computing service at least one of the video content associated with the noise filtered set of metadata or the noise filtered set of metadata.

14. The system of claim 13 wherein the plurality of network devices comprise at least one of cameras or video encoders.

15. The system of claim 13, wherein the metadata processing module is further configured to evaluate the quality of the metadata based on at least one of spatial relationships within video content corresponding to the metadata or temporal relationships within the video content corresponding to the metadata.

16. The system of claim 13 wherein the video processing module is further configured to generate one or more supplementary metadata elements based on the video content.

17. The system of claim 13 further comprising a rule engine communicatively coupled to the gateway, the metadata processing module and the video processing module and configured to receive a query of at least one of the metadata or the video content and to process the query according to one or more predefined rules.

18. A computer program product residing on a non-transitory processor-executable computer storage medium, the computer program product comprising processor-executable instructions configured to cause a processor of a computing system in a gateway between a plurality of network devices and a cloud computing service to:
obtain video content and metadata relating to the video content from a plurality of network devices including first and second network devices that maintain at least some metadata for overlapping geographic areas;
filter the metadata according to one or more criteria to obtain a filtered set of metadata, wherein the processor-executable instructions configured to cause the processor to filter the metadata comprise instruction configured to cause the processor to:
identify a metadata element obtained from the first network device that corresponds to the area for which the first network device and the second network device maintain the at least some metadata elements;
evaluate a quality of the identified metadata element according to the one or more criteria;
classify at least a portion of the metadata as noise when the evaluated quality is below a threshold of the one or more criteria;
determine whether a metadata element corresponding to the metadata element having at least a portion classified as noise has been obtained from the second network device;
identify the metadata element obtained from the first network device as noise if the metadata element corresponding to the metadata element having at least a portion classified as noise has not been obtained from the second network device; and
exclude from the filtered set any metadata element identified as noise to create a noise filtered set of metadata;
determine video frames that are each associated with the noise filtered set of metadata; and upload to a cloud computing service the noise filtered set of metadata or the video frames associated with the noise filtered set of metadata.

19. The computer program product of claim 18 wherein the plurality of network devices comprise at least one of cameras or video encoders.

20. The computer program product of claim 18 further comprising processor-executable instructions configured to cause the processor to:
   receive a query of at least one of the metadata or the video content; and
process the query according to one or more predefined rules.

\* \* \* \* \*